June 18, 1946.  L. B. GREEN  2,402,281
EXTRUSION MOLDING
Filed Oct. 11, 1943
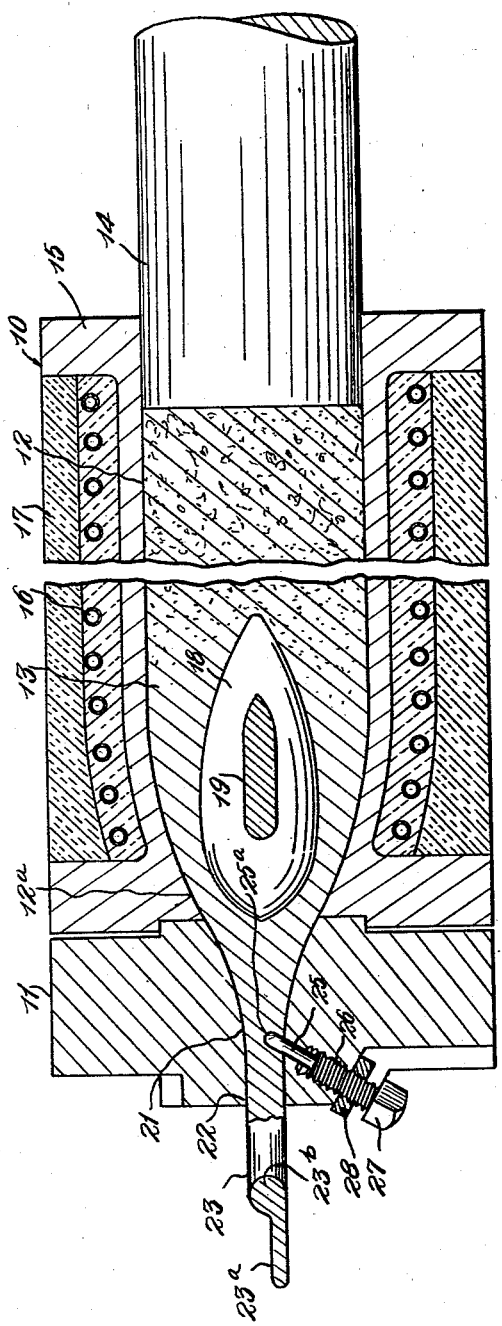
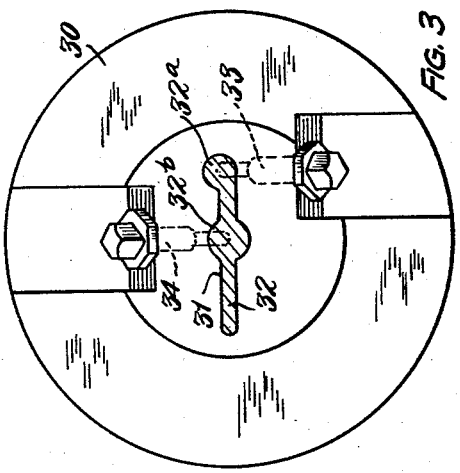
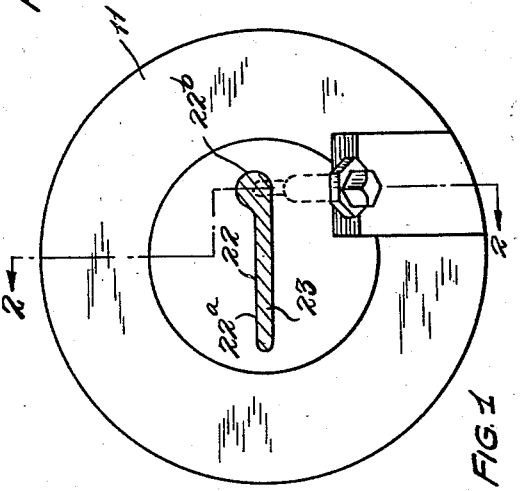
INVENTOR.
LEE B. GREEN
BY
Kwis Hudson Boughton & Williams
ATTORNEYS Patented June 18, 1946

2,402,281

UNITED STATES PATENT OFFICE 2,402,281

EXTRUSION MOLDING

Lee B. Green, Lakewood, Ohio

Application October 11, 1943, Serial No. 505,793

3 Claims. (Cl. 18—12)

This invention relates to the molding of plastic material and more particularly to a novel method and apparatus for extruding such material in a more efficient and satisfactory manner than has been possible heretofore.

The extrusion of plastic material provides a very rapid and economical way of producing certain products such as strip material moldings, tubing and the like. However, when the product to be extruded has relatively thick and thin portions, that is to say, is ribbed or is of an irregular cross-section considerable difficulty is experienced because of the tendency of the product to become bowed or bulged during the extruding operation.

This tendency for the product to become bowed or bulged results from the fact that with a given pressure applied to the plastic material to extrude the same, the material will flow through the die portions corresponding with the relatively thick portions of the product at a faster rate than through the die portions corresponding with the thin portions of the product. Attempts have been made to overcome this difficulty by conveying the extruded products away from the extruding die at an increased rate of speed, but so far as I am aware, this has proven unsatisfactory because it tends to stretch and weaken the relatively thin portions of the product.

Aimed at the elimination of the above mentioned difficulties, my invention provides a novel method and apparatus for extruding plastic material in a manner which prevents such bowing or bulging by appropriately controlling the flow of the material through the extruding die or orifice.

Another object of my invention is to provide a novel method and apparatus for extruding plastic material in which the flow of the material through certain portions of the extruding die is retarded relative to the flow through other portions to obtain a substantially uniform rate of flow for all portions of the die.

Still another object of this invention is to provide a novel method and apparatus for extruding plastic material to form a product having relatively thick and thin portions, in which retarding means in the die portions corresponding with the relatively thick portions of the product retard the flow therein relative to the flow in the die portions corresponding with the relatively thin portions of the product, sufficiently to obtain a substantially uniform rate of flow for all portions of the die.

Other objects and advantages of the invention will be apparent from the following description when taken in conjunction with the accompanying sheet of drawings in which Fig. 1 is an end view of extruding apparatus constructed according to my invention and with which my novel method can be carried out;

Figure 2 is a longitudinal sectional view of the apparatus taken on line 2—2 of Fig. 1, and Fig. 3 is an end view of a modified form of my extruding apparatus.

For a more detailed description of my invention further reference will now be made to Figs. 1 and 2 of the drawing in which I show one form of my novel extruding apparatus 10. This extruding apparatus comprises, in general, an extruding die 11 and a cylinder 12 adapted to containing plastic or thermoplastic material 13. A plunger 14 operable in the cylinder subjects such material to pressure for discharging the same through the reduced portion 12a of the cylinder and through the extruding die 11 as further explained hereinafter.

The cylinder 12 is contained in a body 15 which is suitably supported and forms a part of a conventional form of extruding apparatus. A heating coil 16 disposed around the wall of the cylinder 12 supplies heat to the material 13 to render the same plastic and workable. Thermal insulation 17, located around the coil 16 retards the loss of heat therefrom. As is usual in apparatus of this kind, the cylinder 12 may have a spreader 18 supported therein by a web or rib 19 and located so as to crowd or deflect the plastic material toward the side walls of the cylinder where it will be more effectively heated by the coil 16.

The material 13 may be any plastic material which is capable of being extruded, although the invention is especially applicable to extruding operations using a thermoplastic material, such as the material known as "tenite."

The extruding die 11 comprises a die block having a converging passage 21 therein which, at its delivery end or orifice 22, is of a cross-sectional shape corresponding to that of the product 23 to be extruded. In this instance the product 23 is a strip or molding having a relatively thin flange or web portion 23a and a relatively thick longitudinal rib or bead portion 23b. As shown in Fig. 1 the orifice 22 is of a corresponding shape, that is to say, it has a slot-like portion 22a which forms the web portion 23a of the product and an enlarged portion 22b which forms the longitudinal rib or bead 22b of the product. The extruding die 11 is bolted or otherwise connected with the delivery end of the cylinder-containing body 15, so that the converging passage 21 forms a smooth continuation of the converging portion 12a of the cylinder.

As pointed out above in a general way, when the plastic material 13 is subjected to pressure by the plunger 14 so as to discharge the material through the extruding die 11 to form the extruded product 23, the material will flow more readily through the rib forming portion 22b of the die than it will through the web-forming portion 22a. The reason for this is probably that the area of contact between the plastic material and the die is much greater in the die portion 22a in relation to the volume of plastic material than it is in the die portion 22b. Such relatively larger surface area in relation to the volume of plastic material causes the frictional drag or adhesion between the material and the die surface to retard the flow of the material through the die portion 22a in relation to the flow through the die portion 22b. Unless such variation in the rate of flow of the material through the respective die portions 22a and 22b can be prevented, the more rapid flow through the die portion 22b will cause the extruded product 23 to assume a bowed or bulged condition.

For the purpose of overcoming this undesirable effect in extruding, I provide the die 11 with retarding means by which the flow of material through the die portions 22b can be slowed or retarded sufficiently, so that for a given pressure exerted on the plastic material 13 by the plunger 14, the rate of flow through the die portions 22a and 22b will be substantially equal or uniform. This retarding means is here shown in the form of a pin 25 which extends partway into passage 21 at a point inwardly of the orifice 22. In this instance the pin 25 is of substantially circular cross-section and has a rounded inner end 25a although the shape of the pin can be varied according to the requirements of the extruding die and the cross-sectional shape of the particular product being extruded. The pin 25 may also have a threaded stem 26 and a head 27 and it may be mounted in a relatively inclined opening in the die 11 so that the head will be readily accessible and will enable the stem to be rotated for adjusting the extent to which the pin projects into the passage 21. A lock-nut 28 is provided in cooperation with the threaded stem 26 for locking the pin at the desired setting.

The pin 25 projects into the die passage 21 as above explained, extends into the stream of the plastic material being forced through the passage and orifice and retards the flow of such material through the portion of the passage and orifice in which the pin 25 is located. In this instance the pin 25 extends into the die portion 22b as shown in Fig. 1 and retards the flow of the plastic material in this portion of the die without materially affecting the rate of flow through the adjacent die portion 22a. The retarding effect thus produced by the pin 25 is probably due, in part, to the damming effect of the pin in the passage and, in part, to the fact that the pin increases the area of contact between the plastic material and the die portion in which such pin is located. As the result of the retardation produced by the pin 25 the flow of material will take place at a substantially uniform rate through all portions of the die 11 and bowing or bulging of the extruded product 23 will be prevented. It will be understood, of course, that after passing the pin 25 the stream conforms to the shape of the orifice 22 and that the distance which the pin is spaced inwardly from the orifice can be varied as required by the particular material and product being extruded.

In Fig. 3 of the drawing I show another form of my extruding apparatus in which the extruding die 30 is similar to the extruding die 11 but has a passage and orifice 31 of a somewhat different cross-sectional shape and which forms the extruded product 32. The product 32 is a strip or molding having a longitudinal rib or bead 32a along one side thereof corresponding with the rib or bead 22b of Fig. 1 and another rib or enlargement 32c spaced from the rib 32b. The extruding die 30 is provided with a plurality of the retarding pins 33 and 34 which are substantially identical with the pin 25 above described, but are spaced around the orifice 31 and extend respectively into the rib-forming portions 32a and 32b of the extruding die 30.

From the foregoing description and the accompanying drawing it will now be readily understood that I have provided a novel extruding method and apparatus with which a product of a ribbed or irregular cross-sectional shape can be rapidly extruded without such product having a tendency to become bowed or bulged. It will be seen also that by the use of retarding means in the extruding die, as above explained, a substantially uniform rate of flow is obtained for the plastic material through all portions of the extruding die and the product extruded therefrom will accordingly remain in a straight and unbulged condition.

While I have illustrated and described my novel extruding method and apparatus in more or less detail it will be understood, of course, that I do not wish to be correspondingly limited but regard my invention as including all changes and modifications coming within the scope of the appended claims.

Having thus described my invention, I claim:

1. The method of molding thermoplastic material to produce a product in the form of a strip having a cross-section which includes relatively thick and thin portions, comprising the steps of subjecting heated thermoplastic material to pressure so as to extrude said material at a desired rate through a die opening having relatively wide and narrow portions corresponding with said thick and thin portions of the product, and retarding the flow of said material only in the relatively wide portion of the die opening such that the flow of said material produced by said pressure will be at said desired rate for both the wide and narrow portions of the die opening.

2. In molding apparatus, an extrusion die for delivering a product in the form of a strip having a cross-section which includes relatively thick and thin portions, said die having an orifice and a passage leading to said orifice, said orifice having relatively wide and narrow portions corresponding with said thick and thin portions of the product, means for subjecting heated thermoplastic material to pressure for discharging such material at a desired rate through said passage and orifice to produce said product, and flow retarding means associated only with said relatively wide portion of said orifice so that the flow of said material produced by said pressure will be at said desired rate for both the wide and narrow portions of said orifice.

3. In molding apparatus, an extrusion die for delivering a product in the form of a strip having a cross-section which includes relatively thick and thin portions, said die having an orifice and a passage leading to said orifice, said orifice having relatively wide and narrow portions corresponding with said thick and thin portions of the product, means for subjecting heated thermoplastic material to pressure for discharging such material at a desired rate through said passage and orifice to produce said product, and flow retarding means associated only with said relatively wide portion of said orifice so that the flow of said material produced by said pressure will be at said desired rate for both the wide and narrow portions of said orifice, said retarding means comprising a pin having a rounded end projecting part-way into the portion of said passage leading to said relatively wide portion of the orifice and cooperating screw elements for varying the distance which said pin projects into said passage.

LEE B. GREEN.